(12) United States Patent
Winkler et al.

(10) Patent No.: US 9,194,270 B2
(45) Date of Patent: Nov. 24, 2015

(54) WATER-COOLED DOSING MODULE

(71) Applicant: Robert Bosch GmbH, Stuttgart (DE)

(72) Inventors: Jochen Winkler, Esslingen (DE);
Achim Knittel, Ditzingen (DE);
Stephan Pohl, Schwieberdingen (DE);
Martin Kiontke, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/373,676

(22) PCT Filed: Jan. 4, 2013

(86) PCT No.: PCT/EP2013/050076
§ 371 (c)(1),
(2) Date: Jul. 22, 2014

(87) PCT Pub. No.: WO2013/110484
PCT Pub. Date: Aug. 1, 2013

(65) Prior Publication Data
US 2015/0027108 A1    Jan. 29, 2015

(30) Foreign Application Priority Data

Jan. 27, 2012    (DE) .......................... 10 2012 201 203

(51) Int. Cl.
*F01N 3/00*    (2006.01)
*F01N 3/20*    (2006.01)

(52) U.S. Cl.
CPC .............. *F01N 3/208* (2013.01); *F01N 3/2066* (2013.01); *F01N 2260/024* (2013.01); *F01N 2610/02* (2013.01); *F01N 2610/11* (2013.01); *F01N 2610/1453* (2013.01); *Y02T 10/24* (2013.01)

(58) Field of Classification Search
CPC . F01N 3/2066; F01N 3/208; F01N 2260/024; F01N 2610/02; F01N 2610/1453; F01N 2610/11
USPC .......................................................... 60/295
See application file for complete search history.

(56) References Cited

U.S. PATENT DOCUMENTS 6,192,677 B1    2/2001    Tost
2006/0108443 A1*    5/2006    Huffman et al. .............. 239/132

(Continued)

FOREIGN PATENT DOCUMENTS

DE        4436397        4/1996
DE    102009047375       6/2011

(Continued)

OTHER PUBLICATIONS

International Search Report for Application No. PCT/EP2013/050076 dated May 3, 2013 (English Translation, 3 pages).

*Primary Examiner* — Jason Shanske
(74) *Attorney, Agent, or Firm* — Michael Best & Friedrich LLP

(57) ABSTRACT

The invention relates to a dosing module (10) for metering a reducing agent into an exhaust system of an internal combustion engine. Said dosing module (10) comprises at least one cooling member (22, 24) through which a cooling fluid flows that is used to cool the internal combustion engine. An electric contact (20) is located in the top region of the dosing module (10). The dosing module (10) is enclosed in a full housing (38) that comprises an upper and a lower cooling member (22, 24, 24) through which a directed cooling fluid stream (34) flows that runs from the valve tip region (18) in the direction of the electric contact (20).

14 Claims, 6 Drawing Sheets

(56) References Cited

U.S. PATENT DOCUMENTS

| | | |
|---|---|---|
| 2011/0192140 A1* | 8/2011 | Olivier et al. .................... 60/274 |
| 2014/0054394 A1* | 2/2014 | Bugos et al. ................ 239/132.3 |
| 2014/0299202 A1* | 10/2014 | Winkler et al. ............... 137/340 |
| 2014/0311130 A1* | 10/2014 | Knittel et al. ................... 60/285 |
| 2014/0332180 A1* | 11/2014 | Knittel et al. ................... 165/51 |
| 2015/0059320 A1* | 3/2015 | Winkler et al. ................. 60/295 |

FOREIGN PATENT DOCUMENTS

| | | |
|---|---|---|
| WO | 2012049175 | 4/2012 |
| WO | 2012127010 | 9/2012 |

* cited by examiner

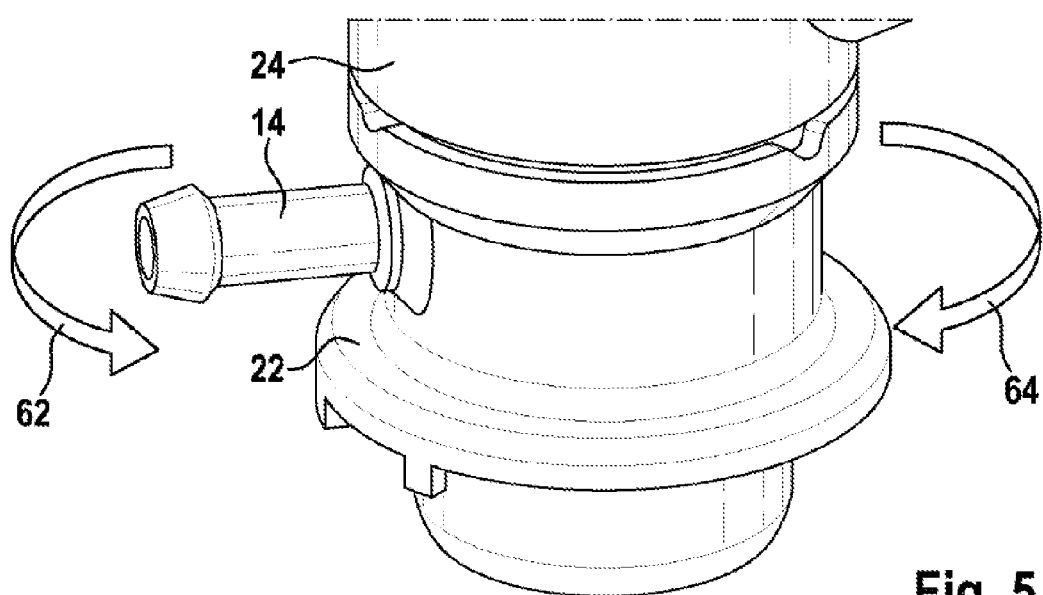

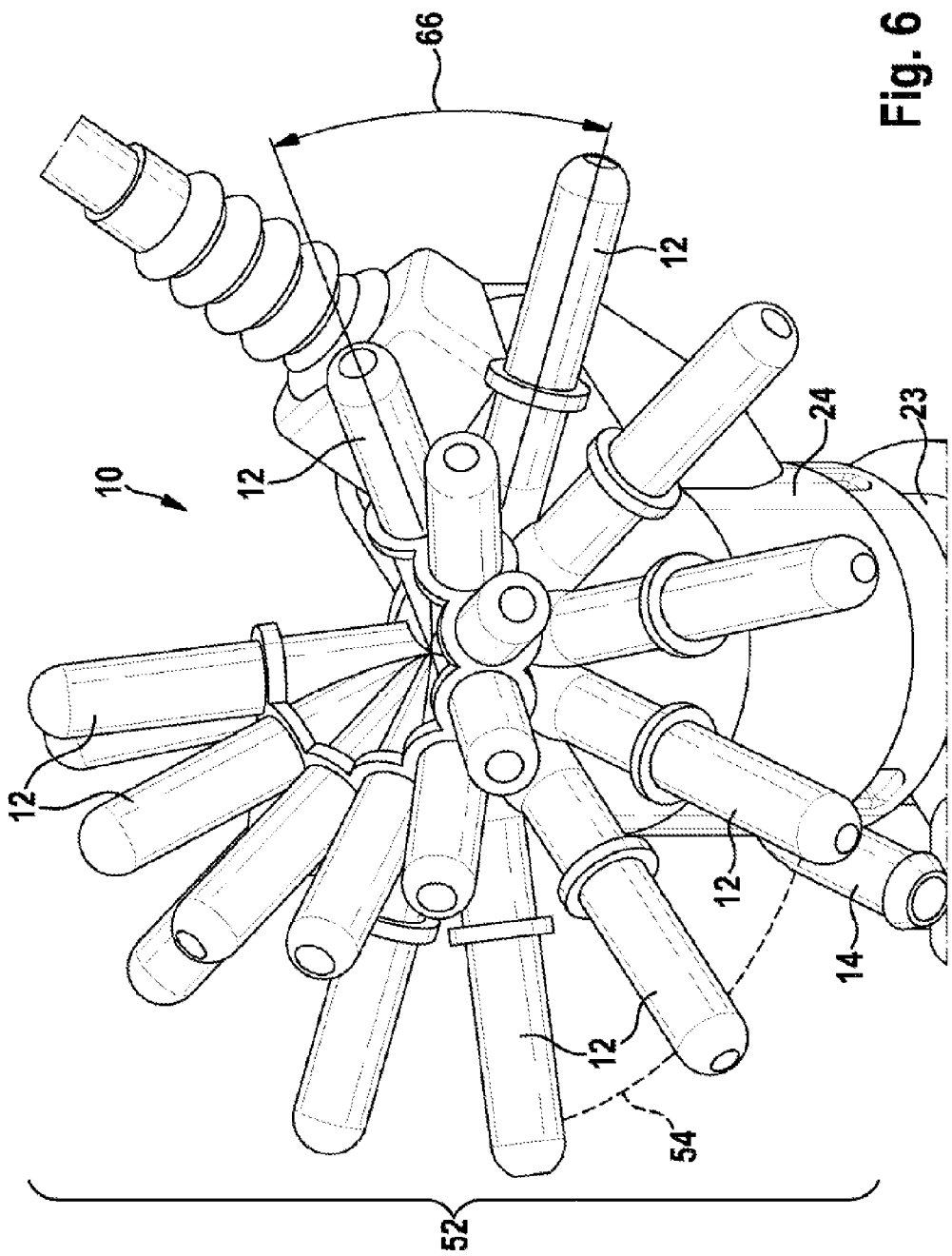

WATER-COOLED DOSING MODULE

BACKGROUND OF THE INVENTION

DE 44 36 397 A1 relates to a device for aftertreating exhaust gases. It discloses a device for aftertreating the exhaust gases from a self-ignition internal combustion engine, in which, to improve the operation of a catalyst with a reducing action, a reducing agent is added to the exhaust gas fed to the catalyst. Here, the reducing agent is added by means of an electrically controlled dosing valve, which is combined in a common housing with a control valve. This control valve is used for the controlled introduction of compressed air supplied, in which a quantity of reducing agent supplied via the dosing valve is prepared and added intermittently to the exhaust gas. This serves, in particular, to avoid urea deposits and adhesions on the dosing valve and the control valve as well as to ensure optimum preparation of the reducing agent introduced.

DE 198 56 366 C1 relates to a device and to a method for aftertreating exhaust gases from an internal combustion engine operating with an excess of air. The proposal is for a device for aftertreating exhaust gases, said device comprising a reduction catalyst that serves to reduce $NO_x$ constituents in the exhaust gas. The device furthermore comprises an electrically controllable dosing device for the controlled introduction of reducing agent into an exhaust line upstream of the reduction catalyst and a device for cooling the dosing device. The dosing device comprises an injection valve, which is surrounded by a double-walled valve holder connected directly to the exhaust line. Moreover, the dosing device comprises a compressed air production device, which blows compressed air into an air gap between an outer wall and an inner wall of the valve holder in order to cool at least those parts of the injection valve which are close to the exhaust gas.

On its side facing away from the exhaust line, the valve holder has a recess matched to the diameter of the injection valve. This recess is bounded by the inner wall, with the result that, in the installed state of the injection valve, the outlet opening of the injection valve is situated just in front of or at the level of the wall provided with a through opening for the reducing agent to be introduced.

In the development of dosing modules (Advanced Dosing Module=ADM), an injection valve is included for the purpose of dosing urea. In order to position the valve tip of this dosing valve as close as possible to the exhaust gas stream, the valve receptacle in this dosing module is actively cooled. This is accomplished by way of a connection between the cooling member and the coolant circuit of the vehicle. This ensures that the temperature of the valve tip does not rise above 120° C., even when the dosing valve is positioned close to the exhaust gas.

One disadvantage of this embodiment is the absence of a cooling effect in the top region, i.e. in the region of the electrical contact means of the dosing valve. As a result, it is not possible to use this dosing module in ambient temperatures above 160° C. The electrical plug connection and the coil of the dosing valve are subject to damage at temperatures above 160° C., and therefore an outage of the valve and/or of the electrical contact means of the dosing valve may be expected.

SUMMARY OF THE INVENTION

According to the invention, the proposal is for a dosing module which is used for introducing a reducing agent into the exhaust gas stream of an internal combustion engine, said module comprising a complete enclosure and being provided with lateral hydraulic connections which allow the possibility of contacting over virtually the entire circumference, i.e. 360°. There is thus the possibility of locating the dosing module proposed according to the invention in the engine compartment of a vehicle in which temperatures above 200° C. may occur, while it is possible to make full allowance for the restricted installation space requirements prevailing there. Dosing valves are generally installed in the region underneath the floor of a vehicle, where there is significantly more installation space available.

By means of the solution proposed according to the invention, it is possible, on the one hand, to allow for the restricted installation conditions in the engine compartment of a vehicle and, on the other hand, it is ensured that, by virtue of the complete enclosure of the dosing valve as proposed according to the invention, said valve can withstand temperatures of 200° C. and above.

By means of the solution proposed according to the invention, in particular through the complete enclosure of the dosing module, cooling of the entire dosing module is ensured. It is advantageously possible to implement the complete enclosure (full enclosure) by means of two additional parts, which are, in particular, designed as sheet metal parts and are mounted on the lower cooling member section. By means of this additional cooling member, it is possible also to cool the upper region of the valve, in which the electrical contact means, represented by a lateral plug outlet for example, is situated. By way of example, the upper, additional cooling member mounted on the lower cooling member can be connected to the lower cooling member by a material joint, e.g. by a laser weld.

In the case of the solution proposed according to the invention, in which the valve is encased by a full enclosure, coolant coming from the vehicle is introduced first of all into the lower cooling member, ensuring that the maximum cooling capacity is available at the hottest point, i.e. at the valve tip of the valve. As a result, optimum cooling of the valve tip region of the dosing module proposed according to the invention is achieved. From the lower cooling member, the cooling fluid, which has now been heated through heat absorption owing to the cooling of the valve tip, crosses into the upper, additional cooling member on the inside in the region of the laser weld. Thus the upper region of the dosing module, in which the electrical connection and the magnet coil are located, can also be cooled. In a manner that is advantageous in terms of production, the full enclosure according to the solution proposed according to the invention can be produced entirely by means of deep-drawn and bent parts, allowing low-cost production of the full enclosure proposed according to the invention surrounding the dosing module.

In addition, the solution proposed according to the invention is characterized in that wide variation in the design of the hydraulic connections is possible. Thus, for example, the hydraulic connection for feeding in the reducing agent, which can be an aqueous urea solution or urea (AdBlue) for example, can theoretically be located along the entire circumference, i.e. over 360°, e.g. at regular intervals of 45° or 30° or less.

The hydraulic connection for the cooling water feed in the lower region of the valve body can be designed to be rotatable through 180°, in steps of 15° or 20° or less for example, with the aid of angled connections.

Owing to this variability in the position of the cooling water inlet, of the cooling water outlet and of the reducing agent feed, it is possible to allow for the restricted installation space conditions in the engine compartment of vehicles.

Through the high variability in the cooling water feeds and cooling water outlets, it is furthermore possible to ensure high variance, i.e. high variability in respect of different customer requirements, depending on the available installation space. Moreover, it is advantageously possible by means of the solution proposed according to the invention to achieve a situation where, by virtue of the full enclosure, cooling of the dosing module is also ensured in the region of the electrical contact means thereof.

As already explained above, the advantages of the solution proposed according to the invention consist in an increased temperature stability of the dosing module proposed according to the invention, allowing it to be installed even in the engine compartment of a vehicle. Moreover, the high variance in the location of the cooling water feeds or of the reducing agent feed makes it possible to allow for different installation conditions in the engine compartment of vehicles.

As a further advantage of the solution proposed according to the invention, it should be mentioned that a smaller cross section of the cooling member can be achieved through radial mounting of the cooling water connections. This, in turn, leads to a smaller design for the sealing and/or fastening region. It is thereby possible, in turn, to use a smaller seal and a smaller clamp, this having a favorable effect on the installation space, thus enabling better account to be taken of customer installation space requirements.

BRIEF DESCRIPTION OF THE DRAWINGS

The invention is described in greater detail below by means of the drawing, in which:

FIG. 5 shows the lower region of the dosing module proposed according to the invention, having a flange of rotatable design, on the circumferential surface of which a cooling fluid feed is mounted, and FIG. 6 shows another variant embodiment of connection locations for the reducing agent feed.

DETAILED DESCRIPTION

A dosing module 10 proposed according to the invention is used to meter a reducing agent into the exhaust system of an internal combustion engine. By means of the reducing agent, the $NO_x$ constituents contained in the exhaust gas from the internal combustion engines are reduced to $H_2O$ and $N_2$. As a reducing agent, use is made primarily of aqueous urea solutions or other urea mixtures. One known reducing agent is known by the trade name AdBlue® and is used in dosing systems of this kind FIG. 1 shows a section through a dosing module 10, which is provided with a full enclosure and comprises a lower cooling member and an upper cooling member.

Figure 1:
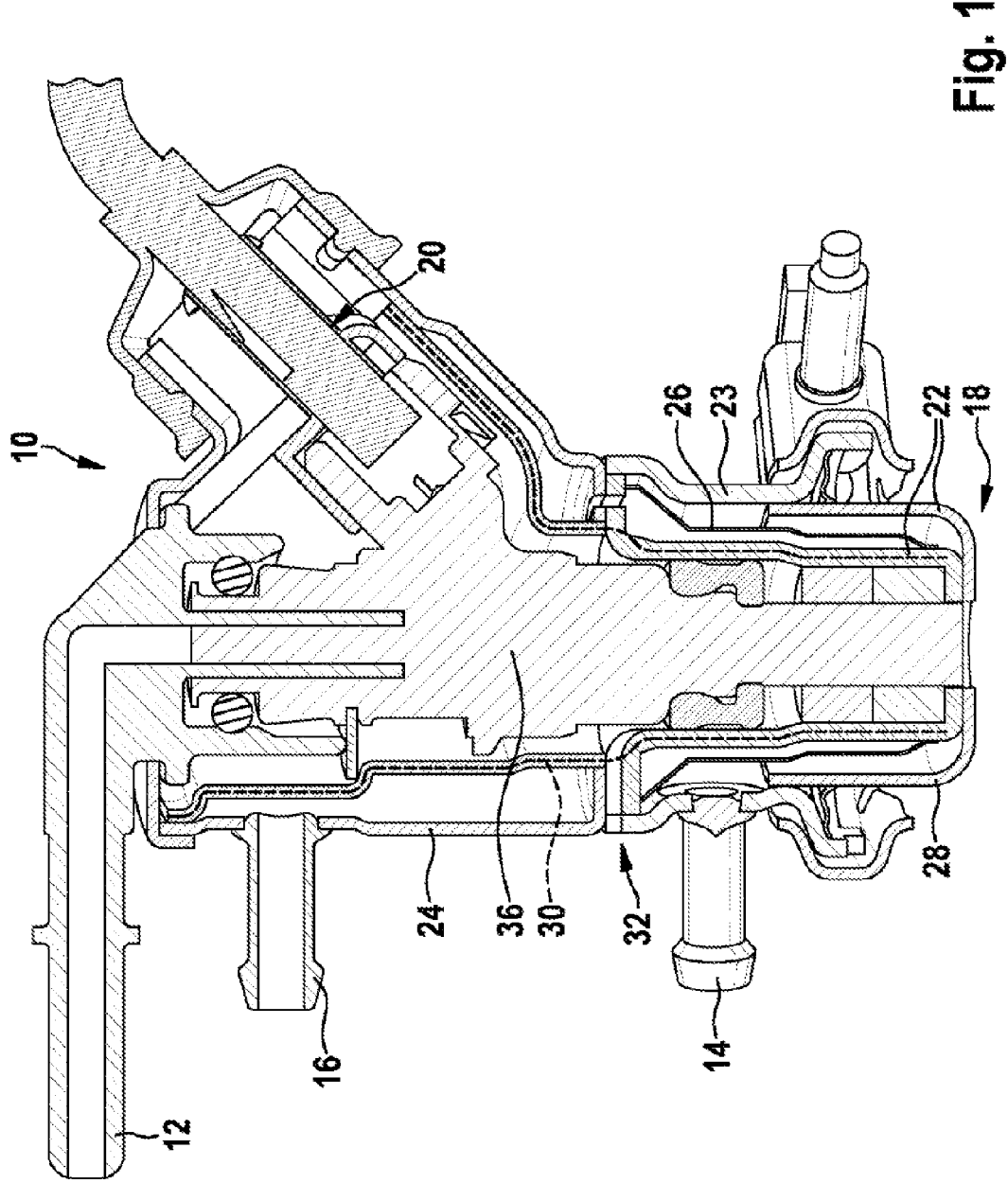
FIG. 1 shows a section through a dosing module having a lower and upper cooling member forming a full enclosure, in section.

The section according to FIG. 1 shows a dosing module, in the upper region of which there extends a laterally projecting reducing agent feed. Via the reducing agent feed 12, the reducing agent flows to a dosing valve 36 of the dosing module 10. The dosing valve 36 of the dosing module 10 is contacted electrically via an electrical contact means 20. The subassembly consisting of the dosing valve 36 comprises a magnet coil, which can be supplied with current via the electrical contact means 20, causing a valve tip in a valve tip region 18 of the dosing valve 36 to open or close. Upon opening of the valve tip, which is situated in the valve tip region 18 of the dosing valve 36, the reducing agent, which is generally in the form of a finely atomized spray mist, is metered into the exhaust system of the internal combustion engine.

As can furthermore be seen from the illustration according to FIG. 1, the dosing valve 10 comprises a cooling fluid feed 14 and a cooling fluid return 16. The cooling fluid feed 14 is situated on the circumferential surface of a flange 23 of rotatable design. The flange 23 is mounted rotatably on the outside of the lower cooling member 22, which furthermore comprises a baffle plate 26. On the outside of the lower cooling member 22 there is a seal 31 of clamp-shaped design.

In the section according to FIG. 1, cooled surfaces on the lower cooling member 22 are denoted by reference sign 28, being indicated by dashed lines here. Similarly, upper cooled surfaces 30, which are wetted by the cooling fluid in the upper, additional cooling member 24, are indicated in dashed lines by reference sign 30. The cooled surfaces 28 and 30 indicated in dashed lines in FIG. 1 are wetted and cooled by the cooling fluid, which is preferably cooling fluid from the cooling circuit of the internal combustion engine. Between the upper, additional cooling member 24 and the annular surface at the upper end of the lower cooling member 22 there is a seal in the form of a material joint 32. This material joint 32 is preferably formed by way of laser welding.

Figure 2:
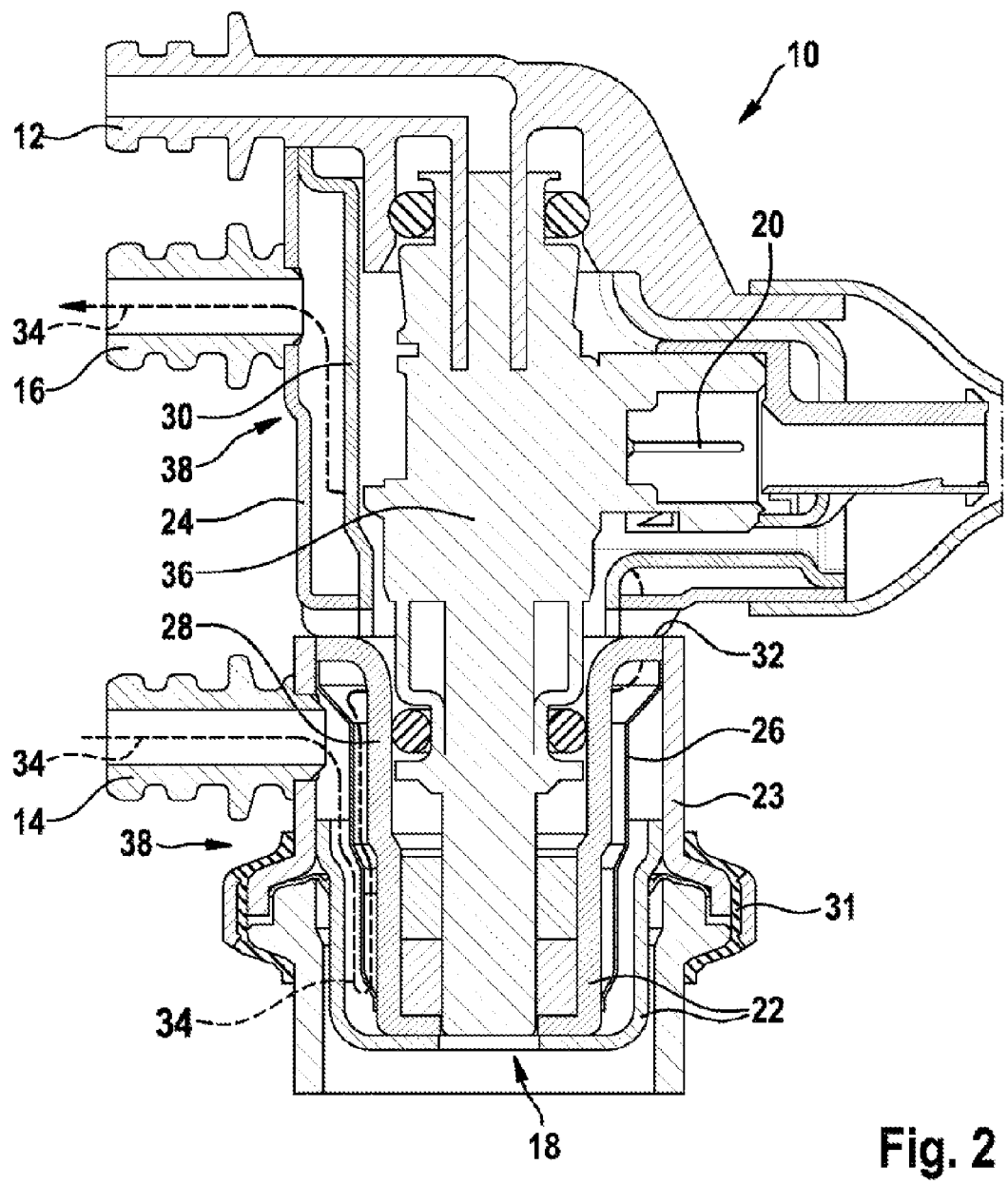
FIG. 2 shows an illustration of the dosing module having a lower cooling member, an upper cooling member and a directional cooling fluid flow through the cooling member.

The illustration according to FIG. 2 likewise shows a section through the dosing module proposed according to the invention, in which there is a directional cooling fluid flow through the lower cooling member and the upper, additional cooling member.

The illustration according to FIG. 2 shows the dosing module 10, which is of substantially similar design to the dosing module 10 illustrated in section in FIG. 1. As is apparent from the illustration according to FIG. 2, the cooling fluid, which is preferably cooling fluid from the cooling circuit of the internal combustion engine, flows into the coolant feed 14, and is deflected downward in the direction of the valve tip region 18 by the baffle plate of cylindrical design surrounding the lower cooling member 22. This means that, after passing through the cooling fluid feed 14, the directional coolant flow 34 initially flows downward in a vertical direction. This means that, in respect of the prevailing temperature level, the cooling fluid with the lowest temperature is directed into the hottest region, i.e. the valve tip region 18, which is closest to the exhaust system of the internal combustion engine. It is thereby possible to achieve a maximum of cooling in the valve tip region 18. After passing through the valve tip region 18, the directional coolant flow 18 flows in a vertical direction, leaving the lower cooling member 22, to the upper, additional cooling member 24 via at least one opening (not shown specifically in the section according to FIG. 2). There, the upper cooled surfaces 30 illustrated in FIG. 1 are wetted by the cooling fluid, which has now been heated owing to heat absorption. In the region of the upper, additional cooling member 24, the cooling fluid then cools the electrical contact means 20 by wetting the upper cooled surfaces 30, making it possible to limit the maximum temperature of said contact means to 160° C.

Since it is now possible to achieve cooling of all components of the dosing module 10 through the cooling proposed according to the invention by means of a full enclosure 38 on the dosing module 10, comprising a lower cooling member 22 and the upper, additional cooling member 24, said dosing module can also be used in the engine compartment of a vehicle and can be exposed to ambient temperatures of 200° C. and above by virtue of the cooling. Owing to the complete cooling of the dosing module 10, there is no risk of an outage or failure of the electrical contact means 20 in the region of the upper, additional cooling member 24.

As is furthermore apparent from the illustration according to FIG. 2, the directional coolant flow 34 leaves the upper, additional cooling member 24 at at least one coolant return 16 and is fed back into the cooling circuit of the internal combustion engine.

Figure 3:
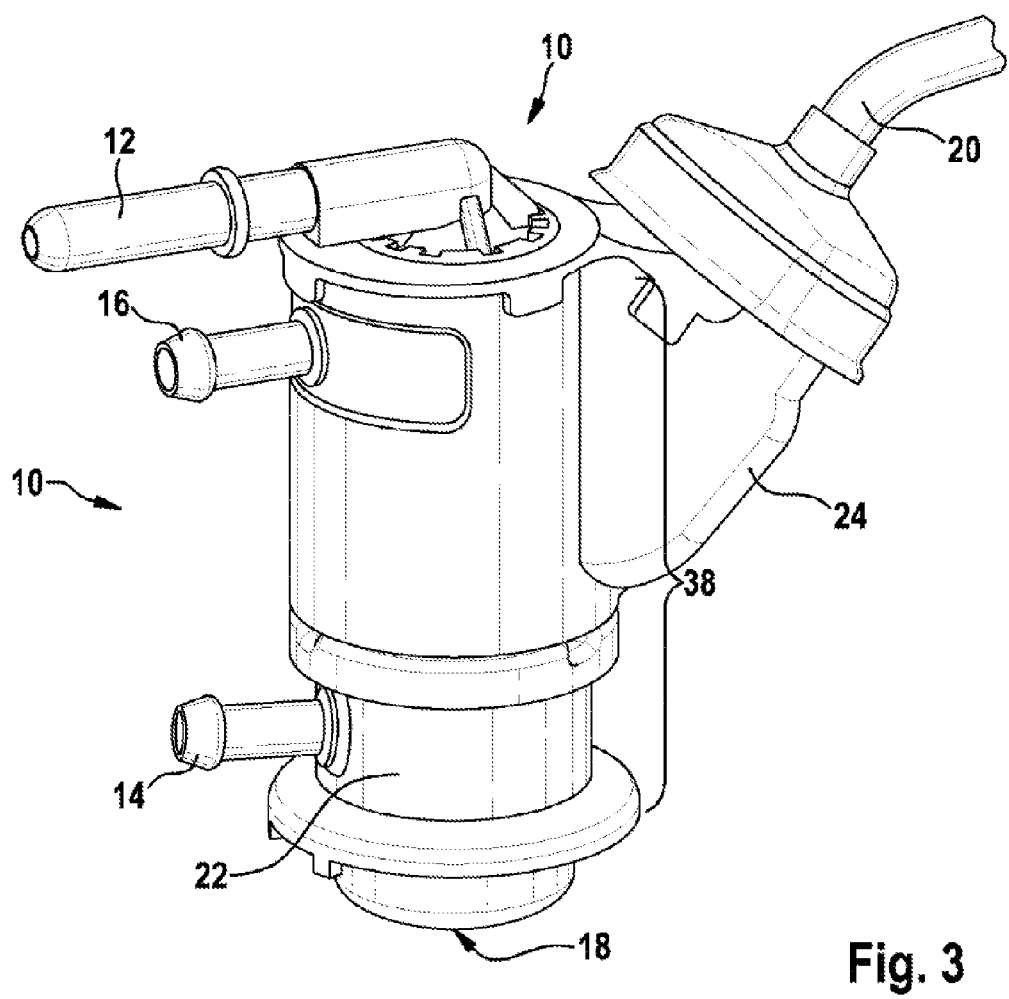
FIG. 3 shows a perspective plan view of the dosing module proposed according to the invention, which is provided with a full enclosure.

FIG. 3 shows a perspective plan view of the dosing module proposed according to the invention.

From the illustration according to FIG. 3, it can be seen that, in this variant embodiment, the reducing agent feed 12, the at least one cooling water return 16 and the at least one cooling fluid feed 14 are arranged one above the other in a vertical plane. This means that the corresponding cooling fluid lines or reducing agent feed line are situated on the same side in relation to the circumferential surface of the dosing module. The electrical contact means 20 already mentioned is situated laterally on the upper, additional cooling member 24, opposite the fluid connections 12, 14, 16 mentioned. The full enclosure 38 is formed by the upper, additional cooling member 24 and the rotatable flange 23, which has the at least one cooling fluid feed 14 and surrounds the lower cooling member 22. Reference sign 18 indicates the valve tip region 18, which is surrounded by the lower cooling member 22 and represents that point of the dosing module 10 which is subject to the highest thermal stress.

Figure 4:
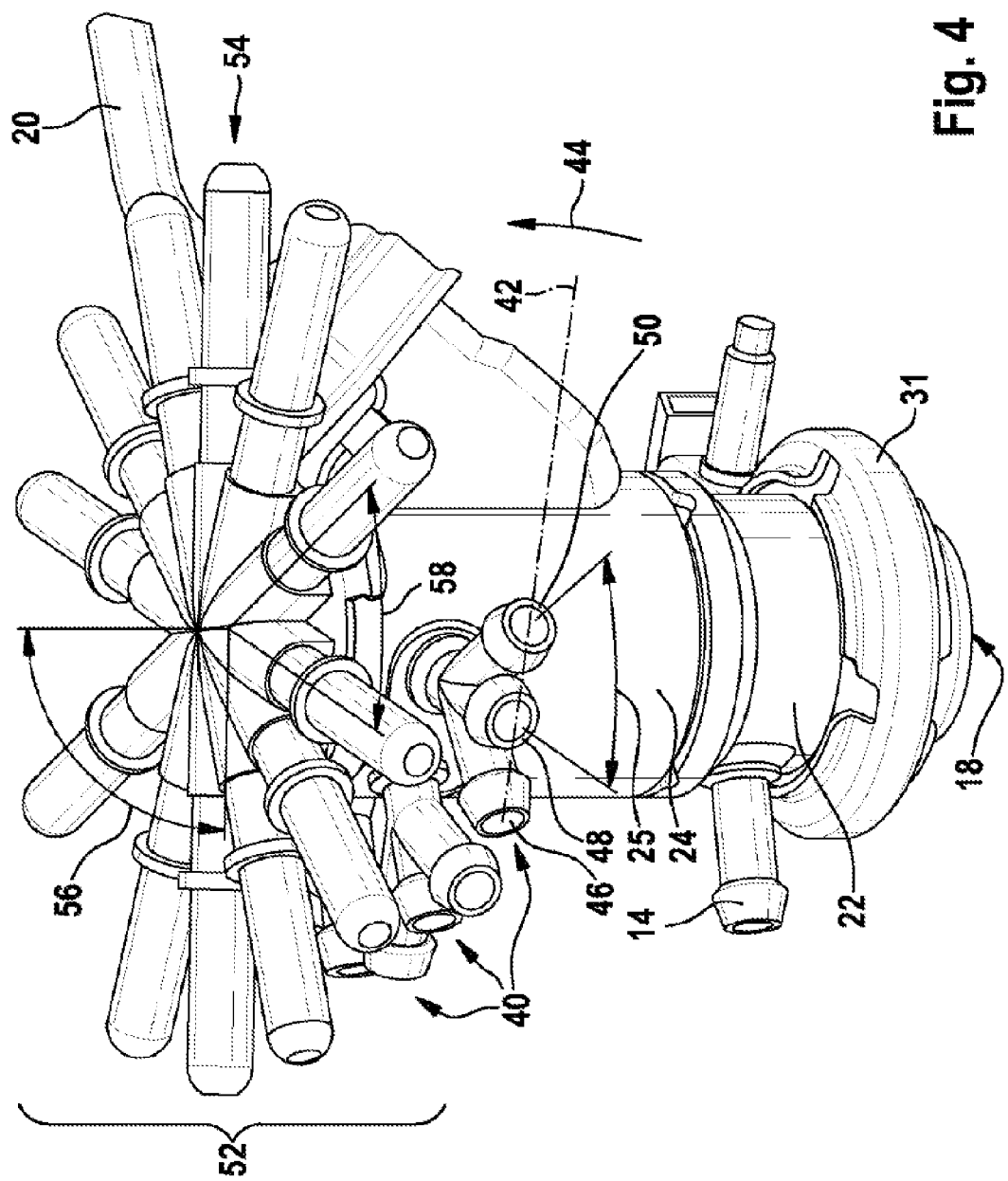
FIG. 4 shows a perspective illustration of the dosing module proposed according to the invention with indicated connection locations in respect of the reducing agent feed and coolant return.

FIG. 4 shows various possible locations of the hydraulic connections, in particular of the reducing agent feed and of the cooling fluid return.

The perspective illustration according to FIG. 4 shows that the cooling fluid return 16 can occupy various connection locations 40 on the circumferential surface of the upper, additional cooling member 24. While only one cooling fluid return 16 is formed on the circumferential surface of the upper, additional cooling member 24 in the sections according to FIGS. 1 and 2 (cf. also the perspective view in FIG. 3), it can be seen from FIG. 4 that the coolant return 16 can also have individual outlets 46, 48, 50. In the illustration according to FIG. 4, the individual outlets 46, 48, 50 of the cooling fluid return 16 are indicated in a horizontal plane 42. However, there is the possibility, for the purpose of enabling and providing a high flexibility in respect of the position of the hydraulic connection lines, in this case particularly of the cooling fluid return lines, of turning the connection locations 46, 48, 50 through 45° for example, or, as illustrated in FIG. 4, through 90°, cf. item 44, if this is required for reasons of installation owing to the restricted installation space conditions in the engine compartment of the vehicle, for example. In respect of the rotatability of the first, second and third connection locations 46, 48, 50, there are various installation options for the formation of short conduit lengths and for optimum usage of the narrowly dimensioned available installation space in the engine compartment of the vehicle. Reference sign 25 denotes a spread angle at which the individual connection locations 46, 48, 50 are oriented relative to one another.

Moreover, there is an illustration of installation locations of the reducing agent feed 12 at the top in FIG. 4. From the perspective illustration chosen in FIG. 4, it is apparent that the reducing agent feed 12 can be arranged at any of the installation locations denoted by reference sign 52. The arrangement of the reducing agent 12 in respect of the circumferential position thereof on the dosing module 10 depends on the installation conditions in the engine compartment of the vehicle and/or on predetermined conduit lengths or conduit locations in the engine compartment of the vehicle. FIG. 4 shows that the locations 52 for the reducing agent feed 12 extend substantially within a horizontal plane 54 in the perspective plan view 4. As a departure from this, there is of course also the possibility, depending on installation space requirements, of tilting the horizontal plane 54 or even of performing a 90° rotation 56, thus allowing the reducing agent feed 12—not shown graphically here—also to be arranged vertically from the top down on the dosing module 10, coaxially with the axis thereof. Instead of the 90° rotation 56 indicated in FIG. 4 in relation to the horizontal plane 54, other angles, which depend on the installation space conditions, could also be chosen.

It is furthermore apparent from FIG. 4 that individual connection locations 46, 48, 50 can be present at a regular interval 60 of 30° or 45° or other arbitrary angles. The same applies to the variance of the reducing agent feeds, which can be arranged at a pitch of 30° or 45°, indicated by reference sign 58 in the perspective illustration according to FIG. 4. As FIG. 4 furthermore shows, it is possible—in contrast to FIG. 3—for the cooling fluid returns 16 to be manufactured as steel or stainless steel tubes by turning, drawing or upsetting, it being possible, as illustrated in FIG. 4, for said returns to occupy different connection locations 46, 48, 50, which lie in the horizontal plane 42 according to this variant embodiment. There is furthermore the possibility of rotating the connection locations 46, 48, 50 in such a way that, departing from the plane 42, they can be arranged in a plane extending vertically from the top downward or in a sloping plane.

FIG. 4 shows that, in accordance with the solution proposed according to the invention, connection locations 40 for the cooling fluid return 16 can have a high variance, thus providing a high degree of flexibility in allowing for a very wide range of customer requirements in respect of the available installation space and in respect of different conduit routes by virtue of the high variance of the connection locations. In the present context, it may furthermore be pointed out that in general just one cooling fluid feed 14 and/or one cooling fluid return 16 are used as part of a cooling fluid circulation system.

Normally, just one cooling fluid feed 14 and one cooling fluid return 16 are implemented. In FIG. 4, a multiplicity of possible locations 52 for the reducing agent feed 12 are illustrated in particular in order to take account of customer installation requirements.

From the illustration according to FIG. 4, it is apparent that the seal 31 of clamp-shaped design is mounted below the rotatable flange 23, on the circumferential surface of which the cooling fluid feed 14 is situated. Extending below the latter, in turn, there is the lower cooling member 22, which accommodates the valve tip region 18.

The lower region of the dosing module 10 proposed according to the invention can be seen in the illustration according to FIG. 5.

From the perspective illustration according to FIG. 5, it is apparent that the rotatable flange 23 is situated below the upper, additional cooling member 24. From the section according to FIGS. 1 and 2, it is apparent that the rotatable flange 23, on the circumferential surface of which the at least one cooling fluid feed 14 is formed, is mounted rotatably on the lower cooling member 22.

From the illustration according to FIG. 5, it can be seen that the rotatable flange 23 can perform a rotary motion, cf. reference sign 62. The angular range through which the rotatable flange 23, which is rotatably mounted on the lower cooling member 22, can be rotated is denoted by reference sign 64 and amounts to at least 180°. The angular range 64 through which the rotatable flange 23 can be moved in the direction of rotation can be traversed in an infinitely variable manner and can be matched to a very wide variety of customer requirements. Rotational indexing steps of the order of >5° are expedient in terms of production.

Situated below the rotatable flange 23 on which the at least one cooling fluid feed is mounted is the lower end of the lower cooling member 22, which surrounds the valve tip region 18, the region of the dosing module 10 which is subjected to the greatest thermal stress.

The dosing module 10 according to the invention described above in conjunction with FIGS. 1 to 5 can be produced almost entirely from deep-drawn components or bent parts, allowing particularly low-cost production of the dosing module 10 proposed according to the invention in large-scale production. Owing to the rotatability of the rotatable flange 23, cf. FIG. 5, and the high variability of the location of the coolant returns 16, cf. plug outlets 40 and outlets 46, 48, 50 as well as the variability as regards the circumferential positioning of the at least one reducing agent feed 10, high variability of the hydraulic connections is provided. The hydraulic connection for the reducing agent, i.e. the reducing agent feed 12, can be located over 360° at regular intervals of, for example, 30° or less. The hydraulic connection for the cooling water feed 14 can be located in an infinitely variable manner over 360°, while the positioning of the hydraulic connections for the cooling water return 16 can be located over 360° in steps of, for example, 20° or 30° with the aid of outlets 40 of angled design.

Another variant embodiment in terms of possible locations of a reducing agent feed can be seen in the illustration according to FIG. 6.

From FIG. 6, it can be seen that the reducing agent feeds can be located at regular intervals of 30° or 45° in a plane 54 extending substantially horizontally. In the illustration according to FIG. 6, a large number of possible locations that can be assumed by the reducing agent feed 12 are indicated in relation to the horizontal plane 54. In practice, the suitable location will be chosen according to the installation conditions for the dosing module 10 proposed according to the invention, and the reducing agent feed 12, which is generally manufactured as a plastic injection molding, will be installed in the appropriate location. Moreover, there is also the possibility in accordance with the solution proposed according to the invention to locate the at least one reducing agent feed 12 at an angle of inclination, cf. item 66 in FIG. 6, e.g. 30° or 45°, and finally of arranging the at least one reducing agent feed in a vertical installation position, i.e. substantially along the axis of the dosing module 10, although this is not illustrated graphically. The illustration according to FIG. 6 also indicates a large number of possible locations in relation to the angle of inclination 66 in which at least one reducing agent feed 12 can be positioned, whereas in practice only one location will be chosen, taking into account the installation conditions available.

Extending on the dosing module 10 according to the perspective plan view according to FIG. 6, below the plane 54 created by the various locations 52 in respect of the at least one reducing agent feed 12, is the upper, additional cooling member 24, below which the rotatable flange 23 comprising the at least one cooling fluid feed 14 is situated.

The invention claimed is:

1. A dosing module (10) for metering a reducing agent into an exhaust system of an internal combustion engine, wherein the dosing module (10) comprises at least one cooling member (22, 24), through which a cooling fluid that is used to cool the internal combustion engine flows and which comprises an electrical contact means (20), characterized in that the dosing module (10) is enclosed by a full housing (38) comprising an upper cooling member (24) and a lower cooling member (22), through which a directional cooling fluid flow (34) flows in the direction of an electrical contact means (20), starting from a valve tip region (18).

2. The dosing module (10) as claimed in claim 1, characterized in that a rotatable flange (23), on a circumferential surface of which there is at least one cooling fluid feed (14), is mounted on the lower cooling member (22).

3. The dosing module (10) as claimed in claim 2, characterized in that the rotatable flange (23) is mounted rotatably on the lower cooling member (22) and can be rotated in an infinitely variable manner in a range (64) of 360°.

4. The dosing module (10) as claimed in claim 1, characterized in that the lower cooling member (22) and the upper cooling member (24) are connected and sealed off by a material joint (32).

5. The dosing module (10) as claimed in claim 4, characterized in that the material joint (32) is designed as a laser weld.

6. The dosing module (10) as claimed in claim 2, characterized in that a baffle plate (26) is situated in a cavity between cooled surfaces (28) of the lower cooling member (22) and the rotatable flange (23).

7. The dosing module (10) as claimed in claim 1, characterized in that at least one connection location (46, 48, 50) for a cooling fluid return (16) is provided on a circumferential surface of the upper cooling member (24).

8. The dosing module (10) as claimed in claim 7, characterized in that connection locations (46, 48, 50) lie in a horizontal plane (42).

9. The dosing module (10) as claimed in claim 7, characterized in that connection locations (40) of at least one cooling fluid return (16) are oriented in a horizontal position (42) or in a vertical position (44).

10. The dosing module (10) as claimed in claim 9, characterized in that the connection locations (46, 48, 50) are arranged at a regular interval (60).

11. The dosing module (10) as claimed in claim 1, characterized in that at least one reducing agent feed (12) is arranged over 360° along a circumference, in a horizontal plane (54).

12. The dosing module (10) as claimed in claim 7, characterized in that connection locations (40) for hydraulic contacting of the cooling fluid return (16) are oriented offset by 180° on the circumferential surface of the upper cooling member (24).

13. The dosing module (10) as claimed in claim 1, characterized in that the at least one reducing agent feed (12) is oriented coaxially with an axis of the dosing module (10).

14. The dosing module (10) as claimed in claim 1, characterized in that, in relation to a horizontal plane (54), at least one reducing agent feed (12) is oriented in a 90° arrangement (56) or at any desired angle to the horizontal plane (54).

\* \* \* \* \*